Inventors
GUIDO MARTELLI
NERIO MARTELLI
FRANCESCO MARTELLI

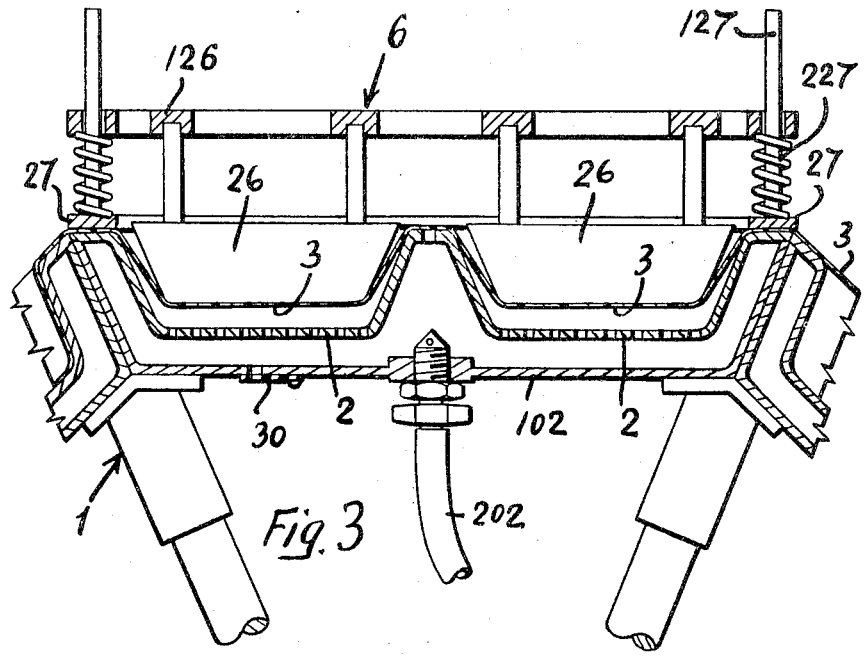
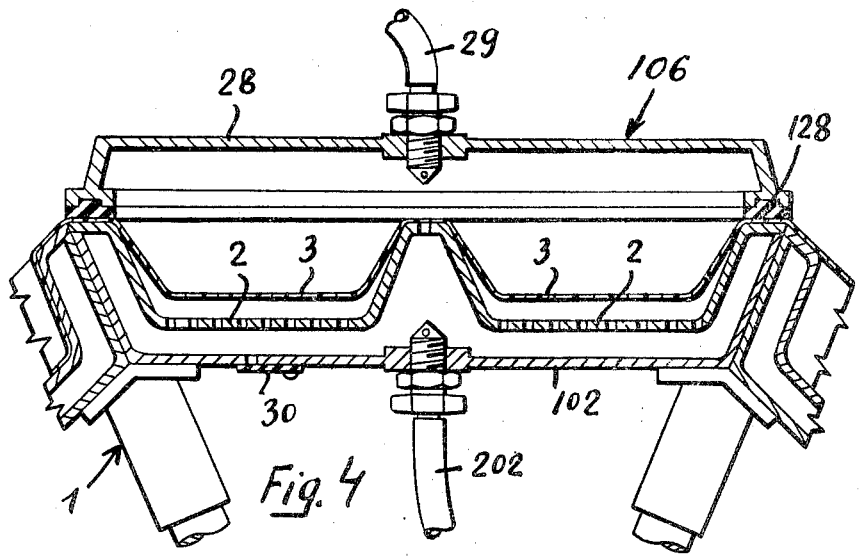

United States Patent Office 3,181,202
Patented May 4, 1965

3,181,202
ROTARY MACHINE FOR THE COMBINED AUTOMATIC VACUUM- AND PRESSURE-FORMING OF CONTINUOUS THERMOPLASTIC BANDS
Guido Martelli, Nerio Martelli, and Francesco Martelli, Bologna, Italy, assignors to Compagnia Italiana Nest-Pack S.p.A., Bologna, Italy, a company of Italy
Filed June 14, 1962, Ser. No. 202,530
Claims priority, application Italy, June 20, 1961, 11,480/61
4 Claims. (Cl. 18—19)

This invention relates to some improvements to machines for the vacuum-forming of sheets of thermoplastic material of the kind as disclosed in our prior Patent No. 2,902,718 and aims to provide a rotary machine comprising a rotatable mold-carrying drum permitting of effecting deeper impressions and/or operating on sheets or bands of thermoplastic material having a greater thickness by punch action, combined with the vacuum-forming.

According to a preferred embodiment of the invention, the combined vacuum-and-pressure forming machine is provided with solid punches which co-act with each vacuum-forming mold of the machine during a fraction of revolution of the said mold-carrying drum and punch into the corresponding mold the heat-softened sheet of thermoplastic material either before, or during and even after the sheet is subjected to the action of the vacuum, thus assisting and supplementing the vacuum action.

According to another embodiment of the invention, it is also possible to use so-called fluid punches by providing means for subjecting the side of the softened sheet of plastic material which is opposite to the mold to the action of a fluid under superatmospheric pressure, and preferably to compressed air, the punching action serving usually for assisting the first forming, while the vacuum action serves for sucking the pre-formed sheet against the walls of perforated molds, thus effecting the end forming.

The invention, as well as its scopes and advantages will be apparent form the following specification made with reference to the accompanying drawing, wherein:

FIGURE 3 shows in longitudinal section and enlarged scale a detail of a mold and the mechanical punch in working position; and FIGURE 4 shows also in enlarged scale a vacuum mold co-acting with a fluid punch.

Figure 1:
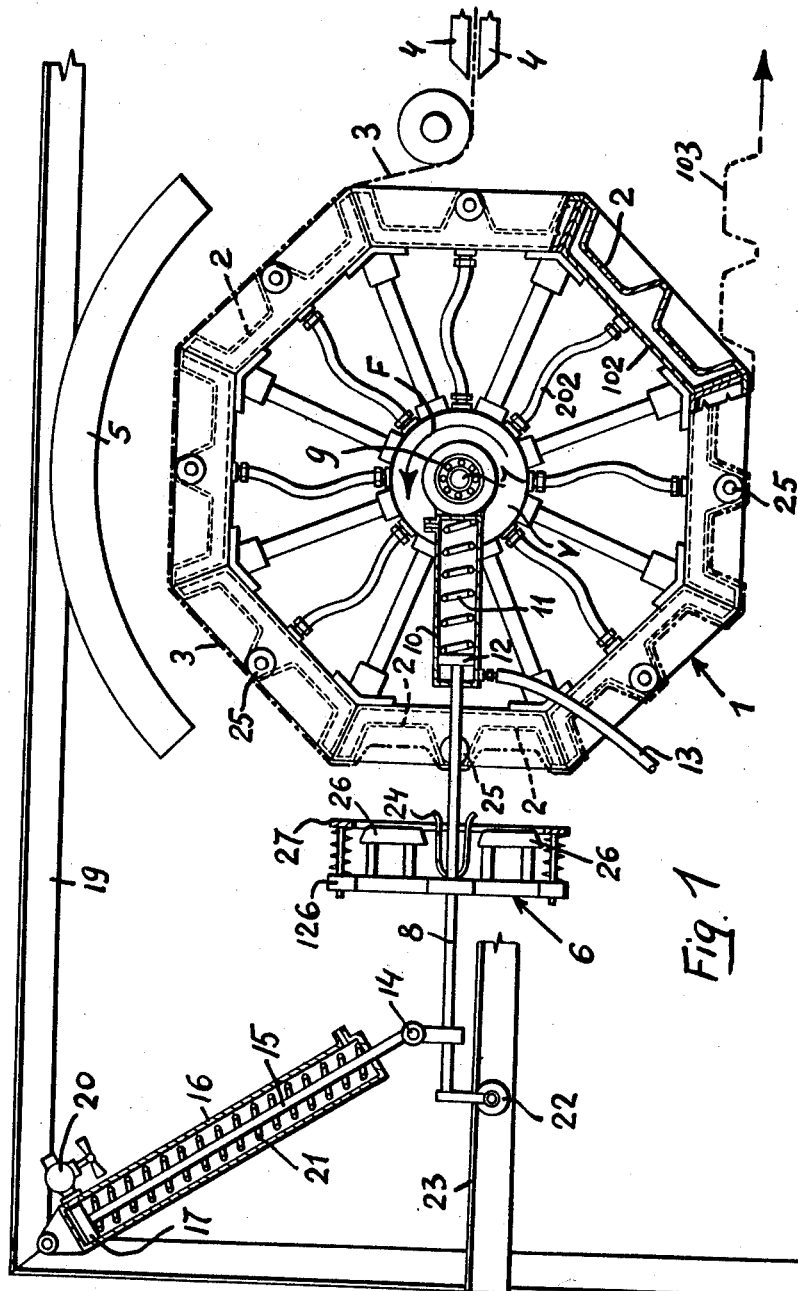
FIGURE 1 shows in elevation with parts in section a rotary vacuum-forming machine comprising a plurality of vacuum-forming molds mounted at the periphery of a drum and adapted to co-act with a mechanical punch, which is shown in non-working position.

The machine for continuously forming thermoplastic sheets or bands as shown in the drawing comprises a vacuum-forming unit of the kind disclosed in our prior U.S. Patent 2,902,718 wherein a drum 1 which may be rotated by conventional means (not shown) in the direction of the arrow F carries a number of vacuum molds 2 provided with perforations and tightly fitted in vat-like cells 102 connected through flexible pipes 202 to a vacuum-distributing valve member V of conventional construction. As in said prior patent, the thermoplastic sheet or band 3 is led around the drum 1 so that it comes to lie on the vacuum molds 2 which are on the top part of the drum 1, where it is softened by being heated by a device 5, partially surrounding the periphery of said drum in spaced relation thereto. The tightness at the sides of the sheet is ensured as disclosed in said patent, by a pair of spring-tensioned endless metallic cords or the like which engage themselves in peripheral grooves of the drum 1. When the machine is designed for forming thick thermoplastic sheets, it may be convenient to arrange a supplementary heating device 4 which heats particularly well the side portions of the sheet, so as to ensure their better clamping by the cords against the drum 1.

In our machine according to our said prior patent, the forming of the heat-softened thremoplastic sheet 3 was effected only by putting the molds 2 into communication with a source of vacuum-distributing valve V for a fraction of one revolution and subsequently putting the same molds into communication with the outside air, so as to permit of detaching the vacuum-formed sheet 103.

The machine thus described is particularly adapted for forming trays or the like from relatively thin sheets of thermoplastic material.

When however said trays or the like, having deep pockets, should be formed from thick sheets of thermoplastic material, it may be convenient to complement the action of the vacuum with the positive action of a punch, which may be either a mechanical or a fluid punch, which are both adapted to start the impression of the sheet, while the end forming is usually effected by vacuum action.

Figure 2:
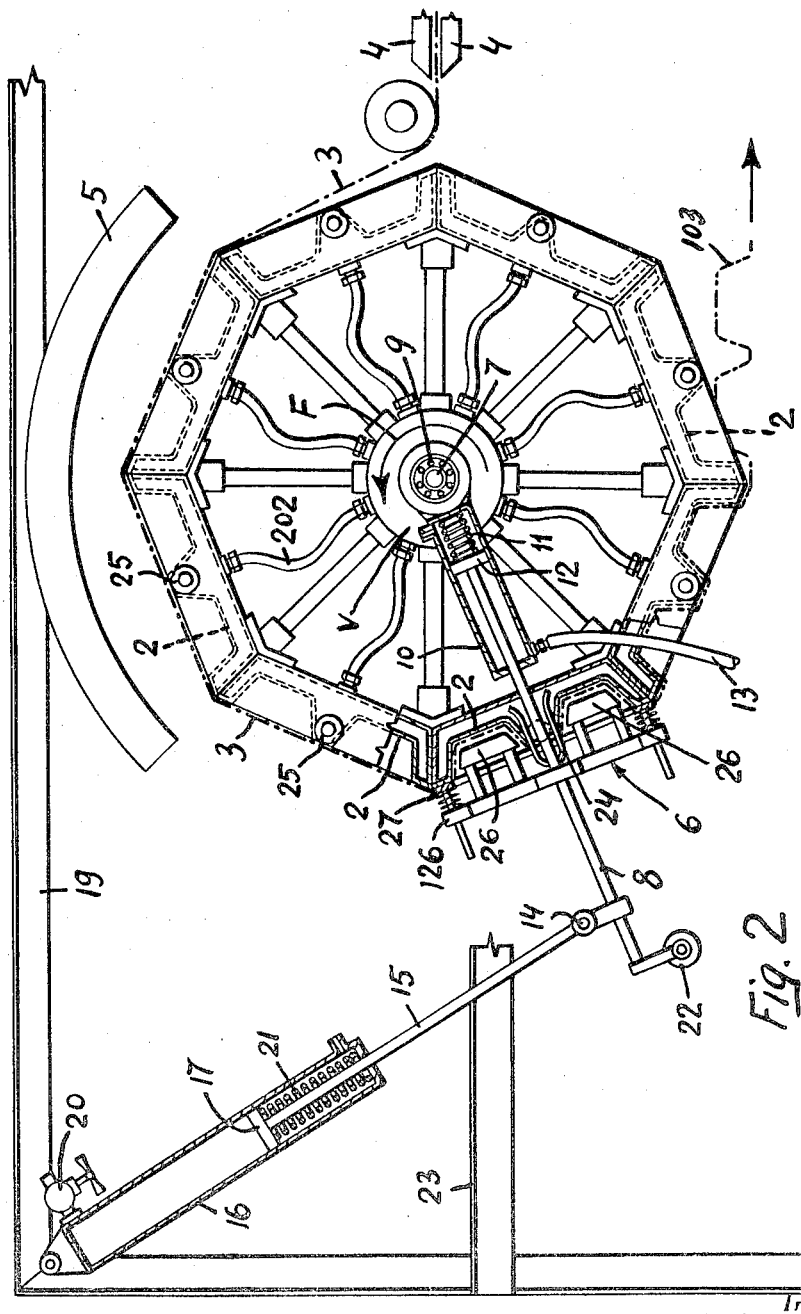
FIGURE 2 shows also in elevation with parts in section the same machine as in FIGURE 1, by which the mechanical punch is inserted in the corresponding mold carried by the drum and has been entrained in rotation for a certain angle by said drum.

In the embodiment as shown in FIGURES 1 through 3, the vacuum molds on the drum 1 co-act with the mechanical punching unit 6 which is mounted in such a manner as to be rocked for a certain angle about the axis of the drum axle 7 and at the same time to be shifted towards or away from the said drum 1. For this purpose, the punching unit 6 is fastened upon one or a pair of parallel rods 8, of which only one arranged at the front side of the drum 1 is shown. In order however to simplify the description, it will be assumed that only one rod is used, carrying at one end a piston 12 slidably mounted in a pneumatic cylinder 10 and urged outwardly by a spring 11 or other spring means to a position in which the punch 6 is clear of the drum 1 (FIG. 1) and which may be pushed inwardly, in a position in which the punch engages a mold 2 (FIG. 2) by compressed air fed into the said cylinder 10 through a flexible pipe 13.

The pneumatic cylinder 10 is freely rotatably mounted on one end of the axle 7 upon which the drum is mounted by means of ball or like bearing 9.

The outer end of the piston rod 8 is hinged as at 14 to the outer end of a piston rod 15 provided at its inner end with a piston 17 slidably mounted in a cylinder 16 hinged to a fixed part or frame 19 of the machine and urged by spring means 21 towards the hinged cylinder end, where a vent valve 20 is mounted. The whole constitutes a back-pull or return device hinged to the machine frame and which urges the punch 6 in the starting position as shown in FIGURE 1, the return speed being regulated by adjusting the vent valve 20. In this angular position the punching unit 6 is maintained fixed by an abutment roll 22 fastened to the free end of the piston rod 8 and which rolls along a guide rail 22 forming part of or fastened to the machine frame.

As said, usually and particularly in larger machines, the just described punch-carrying members are arranged in pairs, at the two drum sides.

The mold-carrying drum 1 and the punching unit 6 are provided with co-acting centering and coupling means such as the forked members 24 provided on each side of the punching unit 6 and which engage corresponding centering rolls 25 arranged on the sides of the drum.

In the embodiment as shown in FIGURES 1 through 3, the punching unit 6 comprises a supporting plate 126 from which the punches proper 26 project and an abutment frame 27 mounted on stems 127 slidable in corresponding holes of said supporting plate 126 and urged by springs 227 away from said plate 126.

The operation is apparent: In the position as shown in FIGURE 1, the vacuum mold 2 facing the punching unit 6 is put into communication through a conventional distributing valve with the source of vacuum and at the same time compressed air is fed through the pipe 13 into the cylinder 10 so as to urge the piston 12 inwardly against the action of the spring 11, until the punches 26 punch the softened plastic sheet 3 into the vacuum mold walls, while the drum 1 is rotated by a certain angle, as shown in FIGURE 2 and entrains the punching unit 6 due to the swiveling connection with the rod 15, which is allowed to come out of its cylinder 16 so as to permit the angular displacement of the rod 8.

Having reached a certain angular position, the connection of the pipe 13 with the source of compressed air is intercepted and, instead, said pipe is allowed to communicate with the outside air, so that the spring 11 is allowed to expand and the parts re-assume the position as shown in FIGURE 1, ready to again be pressed into the next-subsequent mold, which, in the meantime, has assumed the position as shown in FIGURE 1, and so have also the other parts connected to the punch unit.

At the same time, the same mold 2 is put into communication with a source of vacuum through the flexible pipe 202 and thus the sheet, which has been pre-formed by the punch 26, is sucked by the vacuum against the mold walls and thus assumes its final shape.

In the embodiment as shown in FIGURE 4, the softened thermoplastic sheet is first blown into the vacuum mold, down to a certain depth, by a compressed fluid—usually air—. In this case the punching unit 106, which is mounted like the punching unit 6 of the previous embodiment, is in form of a lid 28 which is provided at its edges with a packing gasket 128 having the outline of the vacuum mold edges. After the softened plastic sheet 3 has been pre-formed, it is sucked against the mold walls by putting the mold into communication with a source of vacuum through the pipe 202 and the mold perforations, thus assuming its final shape. Then the compressed air and the vacuum are eliminated by putting the pipes 29 and 202 into communication with the outside air and the formed sheet may be detached from the mold as in the simple vacuum forming machines.

From the foregoing, it is apparent that the invention provides means for assisting the action of the vacuum in pressing softened thermoplastic sheets, even of considerable thickness into the molds.

We claim:

1. In a rotary machine for the combined automatic vacuum and pressure forming of continuous thermoplastic bands or sheets including a rotatable drum, a plurality of perforated molds around the periphery of said drum, heating means near the periphery of said drum, means for feeding a continuous strip of thermoplastic sheet material onto the periphery of said drum and in the vicinity of said heating means, suction means in communication with the perforations of said molds for drawing the sheet material into engagement with the mold surfaces, valve means controlling said suction means and operative upon rotation of said drum to place said suction means in communication with said molds successively as the respective molds are revolved and sealing means engageable with the sheet material to form an airtight seal with said drum around each of said molds, the improvements comprising first coupling means projecting from said drum in spaced positions along its periphery in correspondence of each of said molds, a punch having an initial position spaced radially from the periphery of said drum, fluid operated means for successively shifting said punch into engagement with the strip of thermoplastic sheet material upon each mold and pressing the sheet into the mold radially, second coupling means extending radially on said punch coacting with said first coupling means on said drum whenever said punch is being shifted into engagement with a strip of thermoplastic sheet material upon a mold and guiding the radial movement of the punch into the mold, said punch while inserted in a mold being entrained by said drum for a fraction of its revolution, means associated with said fluid operated means for withdrawing said punch clear of said punched sheet and the corresponding mold, and spring means pivotally connected to said punch for returning the punch to its initial position.

2. In a rotary machine for the combined automatic vacuum and pressure forming of continuous thermoplastic sheets, the improvements according to claim 1 in which said first coupling means comprise rolls pivotably secured at positions on each side of said drum symmetrically corresponding to said molds and the second coupling means comprises forked members on each side of the punch.

3. In a rotary machine for the combined automatic vacuum and pressure forming of continuous thermoplastic sheets, the improvements according to claim 1 wherein the said punch comprises a supporting plate, a solid punch member fastened to said plate so as to project in the direction of said drum, an abutment frame surrounding said punch, means for slidably mounting said frame to said plate and biasing means urging said frame away from said plate.

4. In a rotary machine for the combined automatic vacuum and pressure forming of continuous plastic sheets, the improvements according to claim 1 wherein; said fluid operated means for shifting the punch comprises a fluid pressure cylinder pivoted on an axis common to said drum, a piston in said cylinder, means for admitting pressure fluid to said cylinder to urge the piston toward the axis of said drum, a piston rod connecting said piston to the punch and extending radially beyond the punch, a rail disposed outwardly of said drum, and means releasably guiding the outer, free end of said piston rod along said rail; said means for withdrawing said punch comprises a spring in said fluid pressure cylinder urging said piston away from the axis of said drum; and said spring means for returning the punch to its initial position comprises a second cylinder pivoted at its outer end so as to lie movably at an angle to said rail, a second piston in said second cylinder connected to a second piston rod extending through an opening in the inner end of the second cylinder, said second cylinder communicating at both ends with the exterior and being provided at its outer end with a vent valve, a spring in said second cylinder urging said second piston outwardly, and a pivot connecting said second piston rod to the outer free end of said first piston rod.

References Cited by the Examiner

UNITED STATES PATENTS

| 483,663 | 10/92 | Warren | 18—21 |
| 2,902,718 | 9/59 | Martelli et al. | 18—19 |
| 2,973,558 | 3/61 | Stratton | 18—56 |
| 3,027,596 | 4/62 | Knowles | 18—21 XR |
| 3,071,812 | 1/63 | Miller | 18—21 |

FOREIGN PATENTS 751,068   6/56   Great Britain.

MICHAEL V. BRINDISI, *Primary Examiner.*